(12) United States Patent
Pfaffenrath et al.

(10) Patent No.: US 10,882,146 B2
(45) Date of Patent: Jan. 5, 2021

(54) MAGAZINE

(71) Applicant: WEBER SCHRAUBAUTOMATEN GmbH, Wolfratshausen (DE)

(72) Inventors: Erwin Pfaffenrath, Königsdorf (DE); Wolfgang Wagenstaller, Wolfratshausen (DE); Jochen Hartmann, Lenggries (DE)

(73) Assignee: Weber Schraubautomaten GmbH

( * ) Notice: Subject to any disclaimer, the term of this patent is extended or adjusted under 35 U.S.C. 154(b) by 227 days.

(21) Appl. No.: 15/578,127

(22) PCT Filed: Jun. 6, 2016

(86) PCT No.: PCT/EP2016/062789
§ 371 (c)(1),
(2) Date: Nov. 29, 2017

(87) PCT Pub. No.: WO2016/198356
PCT Pub. Date: Dec. 15, 2016

(65) Prior Publication Data
US 2018/0154487 A1 Jun. 7, 2018

(30) Foreign Application Priority Data
Jun. 8, 2015 (DE) .......... 10 2015 109 024

(51) Int. Cl.
*B23P 19/00* (2006.01)
*B25B 23/06* (2006.01)
(Continued)

(52) U.S. Cl.
CPC .......... *B23P 19/005* (2013.01); *B23P 19/001* (2013.01); *B23P 19/004* (2013.01); *B25B 23/06* (2013.01); *B25B 23/08* (2013.01); *B21J 15/32* (2013.01)

(58) Field of Classification Search
CPC ..... B23P 19/005; B23P 19/001; B23P 19/004; B25C 3/00
(Continued)

(56) References Cited

U.S. PATENT DOCUMENTS 5,947,362 A * 9/1999 Omli .................. B25C 5/1693
227/120
8,690,037 B2 * 4/2014 Wenzel ............... B23P 19/006
227/120
(Continued)

FOREIGN PATENT DOCUMENTS

CN 104625360 A * 5/2015
CN 104625360 A 5/2015
(Continued)

OTHER PUBLICATIONS

CN-104625360-A Machine Translation (Year: 2019).*
(Continued)

*Primary Examiner* — Anna K Kinsaul
*Assistant Examiner* — Veronica Martin
(74) *Attorney, Agent, or Firm* — Dickinson Wright PLLC (57) ABSTRACT

The invention relates to a magazine (24) for holding a plurality of joining elements (10) and for feeding said joining elements (10) to a joining device (27), comprising two storage grooves (38) for storing and guiding the joining elements (10), said storage grooves extending at least in sections along two mutually concentric circular paths.

16 Claims, 13 Drawing Sheets

(51) Int. Cl.
*B25B 23/08* (2006.01)
*B21J 15/32* (2006.01)

(58) Field of Classification Search
USPC .................................................. 227/107–156
See application file for complete search history.

(56) References Cited

U.S. PATENT DOCUMENTS

| | | | | |
|---|---|---|---|---|
| 2007/0108250 | A1* | 5/2007 | Odoni | ........................ B25C 1/06 227/107 |
| 2010/0018354 | A1* | 1/2010 | Kuboyama | ............. B25B 23/08 81/57.37 |
| 2011/0245052 | A1 | 10/2011 | Ohno et al. | |
| 2014/0020814 | A1 | 1/2014 | Drüke et al. | |

FOREIGN PATENT DOCUMENTS

| | | |
|---|---|---|
| DE | 102008051489 A1 | 4/2010 |
| DE | 102009040764 A1 | 3/2011 |
| DE | 102011009259 A1 | 7/2012 |
| DE | 102013211128 A1 | 12/2014 |
| JP | S61112831 U1 | 7/1986 |
| JP | S61277513 A | 12/1986 |
| JP | H0557537 A | 3/1993 |
| JP | H0715634 U | 3/1995 |
| JP | H10180577 A | 7/1998 |
| JP | 2003314121 A | 11/2003 |
| JP | 2007106546 A | 4/2007 |
| JP | 2007112539 A | 5/2007 |
| JP | 200720163 A | 10/2007 |
| JP | 2010029959 A | 2/2010 |
| JP | 20100064239 A | 3/2010 |

OTHER PUBLICATIONS

European Search Report from the European Patent Office for related EP Application No. PCT/EP2016/062789; dated Sep. 6, 2016; 6 pages.
Communication received from the Patent Office in Japan for related Japanese Patent Application No. 2017-563606; dated Oct. 1, 2017; 7 pages.
Communication received from the Patent Office in Japan for related Japanese Patent Application No. 2017-563606; dated May 19, 2020; 7 pages.

* cited by examiner

MAGAZINE

CROSS-REFERENCES TO RELATED APPLICATIONS

This patent application is a 371 of International Application No. PCT/EP2016/062789, filed Jun. 6, 2016 which claims the priority of German Application No. 102015109024.4, filed Jun. 8, 2015 each of which is incorporated herein by reference in its entirety.

The present invention relates to a magazine for receiving a plurality of joining elements and for supplying the joining elements to a joining apparatus.

Such a magazine is generally known. DE 10 2008 051 529 A1, for example, thus discloses a magazine which is integrated into a setting unit, which has a spiral storage groove, and by means of which joining elements introduced into the storage groove at the outer margin of the magazine are conveyed into the center of the magazine and are dispensed to a head piece of the setting unit via a centrally arranged magazine outlet. This magazine has the disadvantage that only one type of joining elements can be stored in the magazine and supplied to the head piece of the setting unit.

It is the underlying object of the invention to provide a magazine that enables a more versatile deployment.

This object is satisfied by a magazine having the features of claim 1 and in particular in that the magazine has at least two storage grooves for storing and guiding the joining elements, wherein the storage grooves extend at least sectionally along mutually concentric circular paths.

It is the underlying idea of the invention not to equip the magazine with a single spirally extending storage groove, but instead to select a substantially circular storage groove extent that allows two or even more than two storage grooves to be provided that can extend at least partly in parallel with one another. It is in turn possible by the formation of at least two storage grooves to store at least two different types of joining elements in the magazine and to dispense them as required, namely selectively from the one storage groove or from the other storage groove. As a result, the magazine can therefore be used with more variability and versatility.

The joining elements can be screws, in particular metal screws, elements that are processed in flow drilling processes, or also thread-free setting elements that are processed in friction welding processes and can comprise a metal material or also a plastic material.

Advantageous embodiments of the invention can be seen from the dependent claims, from the description and from the drawing.

In accordance with an embodiment the storage grooves are of different designs. For example, the storage grooves can be adapted to different types of joining elements, e.g. to be able to receive differently designed joining elements in a shape-matched manner, whereby a particularly reliable storage of the joining elements in the storage grooves and a movement of the joining elements along the storage grooves is achieved. It is, however, understood that it is generally also possible to design the storage grooves with an identical profile.

A head guide to guide heads of stored joining elements is advantageously provided in the region of an open side of the or each storage groove. It is prevented by the head guide that the joining elements can fall out of the storage grooves when the magazine is opened in a position in which the open sides of the storage grooves face downward. The head guide can, for example, comprise at least one rail that is spaced apart from the open side of the storage groove and that partly projects over the heads of the stored joining elements.

In accordance with a further embodiment, the magazine has a feed mechanism for moving the stored joining elements along the storage grooves. The feed mechanism in other words provides a conveying of the stored joining elements from an inlet to an outlet of the magazine.

Nozzle apparatus that blow the stored joining elements along the storage grooves can generally be considered as the feed mechanism or also sliders that push the stored joining elements onward mechanically. A particularly simple and robust form of feed mechanism, however, comprises a plate brush whose bristles are in engagement with the stored joining elements. The plate brush is preferably rotatable about an axis of rotation that extends through the center of curvature of the storage grooves, i.e. the storage grooves and the plate brush have the same center.

The bristles are advantageously only arranged along two concentrically extending circular paths that coincide with the storage grooves. In other words, due to the circularly extending storage grooves, the bristles do not have to be arranged distributed over the total surface of the plate brush, but only along tracks associated with the storage grooves, whereby the plate brush can be manufactured more simply and less expensively.

In accordance with a further embodiment, the storage grooves extend in a circular manner over an angular region of at least 180°, i.e. they do not form any closed circles, but rather only part circles to facilitate the receiving and dispensing of the joining elements. The receiving and dispensing of the joining elements is additionally simplified when the end sections of the storage grooves diverge slightly.

A blocking mechanism that prevents the joining elements from falling out of the storage groove is provided in the region of an inlet end of the or each storage groove at which the joining elements can be introduced into the storage groove. The blocking mechanism can, for example, comprise two movably supported catches that are preloaded with respect to one another by spring force to block the storage groove. To facilitate the introduction of the joining elements into the storage groove, the blocking mechanism is configured such that it can be forcibly opened by a means for providing joining elements to be introduced into the storage grooves.

In accordance with a further embodiment, a separation unit is arranged in the region of outlet ends of the storage grooves at which the joining elements can be removed from the storage grooves to transfer a joining element selectively removed from the one or the other storage groove to a magazine outlet. The separation unit can comprise at least one separation slider. A separation slider is preferably associated with each storage groove, with the separation sliders being controllable separately and being actuable independently of one another, in particular pneumatically. A particularly compact construction form is achieved when the separation sliders can be displaced in a direction that extends transversely to the end sections of the storage grooves.

In accordance with yet a further embodiment, the magazine has a compressed air device by means of which a joining element is movable out of the separation unit into the magazine outlet. The magazine outlet preferably forms a connector for a hose line by means of which a joining element output by the magazine can be supplied to a tool, for example. A joining element can be blown by means of the compressed air device out of the separation unit via the machine outlet and the hose line up to the tool, whereby the supply of the joining element to the tool can be reliably implemented independently of gravity and consequently in the most varied positions of the tool in space.

A further subject matter of the invention is a joining apparatus having a magazine of the above-described type. The above advantages can be correspondingly achieved by the joining apparatus in accordance with the invention.

In accordance with an embodiment, the magazine is attached to an outer side of the joining apparatus. The magazine can be installed simply and in particular also retroactively at the joining apparatus or can be simply dismantled from the joining apparatus for purposes of replacement or maintenance.

In accordance with a further embodiment, a joining element removed from the magazine can be supplied to a tool of the joining apparatus by means of compressed air. Due to the supply of the joining element by means of compressed air, the magazine does not have to be integrated into the joining apparatus such that a joining element output from the magazine falls toward the tool due to gravity. It is rather possible to connect the magazine via a hose line to a tool head of the joining apparatus supporting the tool. This contributes to a simplification of an attachment of the magazine, also retroactively under certain circumstances, to the outside of the joining apparatus, which ultimately means that there is greater freedom on the installation of the magazine at the joining apparatus and that the magazine can be easily replaced as required.

A further subject matter of the invention is a system comprising a joining apparatus, in particular of the above-described manner, and an allocation apparatus for providing a plurality of joining elements that has a storage line that has at least two tracks and that is couplable to a magazine of the joining apparatus for the buffering of the plurality of joining elements and that has a transfer device to transfer the plurality of joining elements from the coupled storage line into the magazine.

The invention will be described in the following purely by way of example with reference to possible embodiments and to the enclosed drawing. There are shown.

Figure 1:
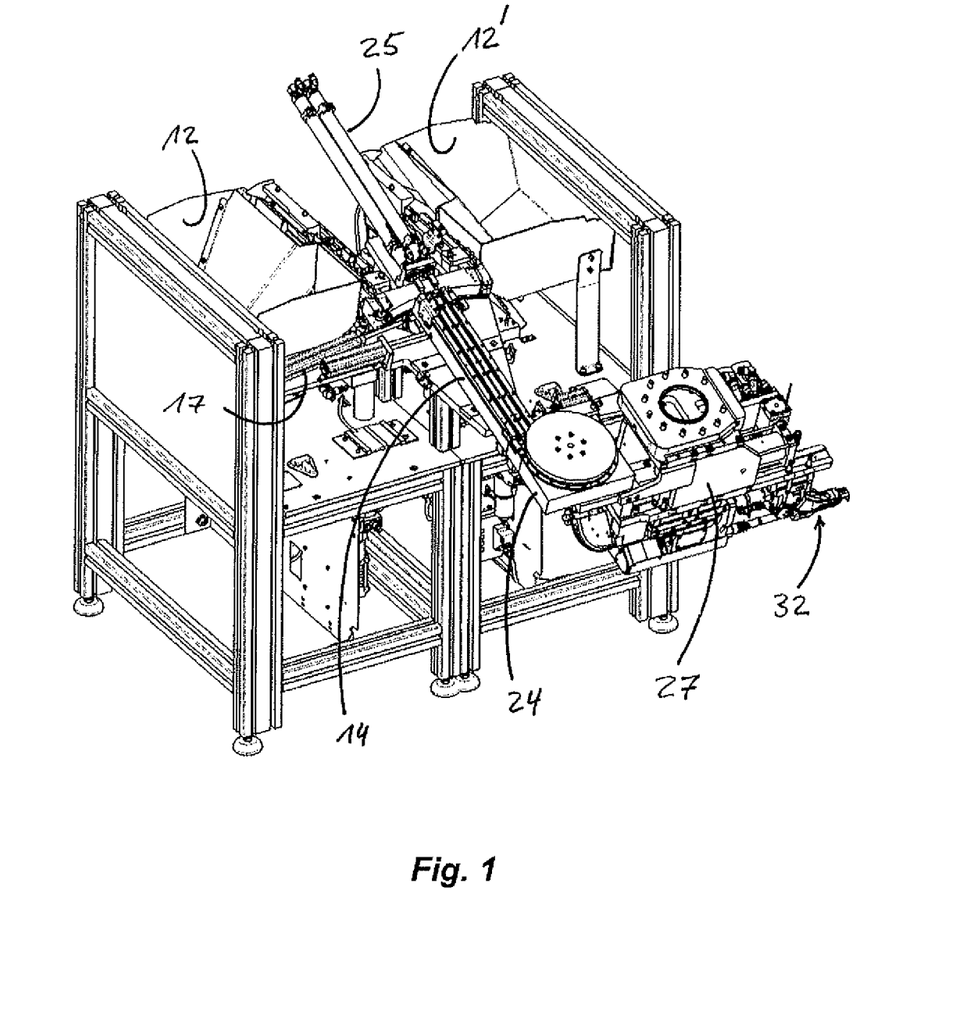
FIG. 1 a joining system in accordance with the invention with two reservoirs for joining elements to be processed.
Figure 2:
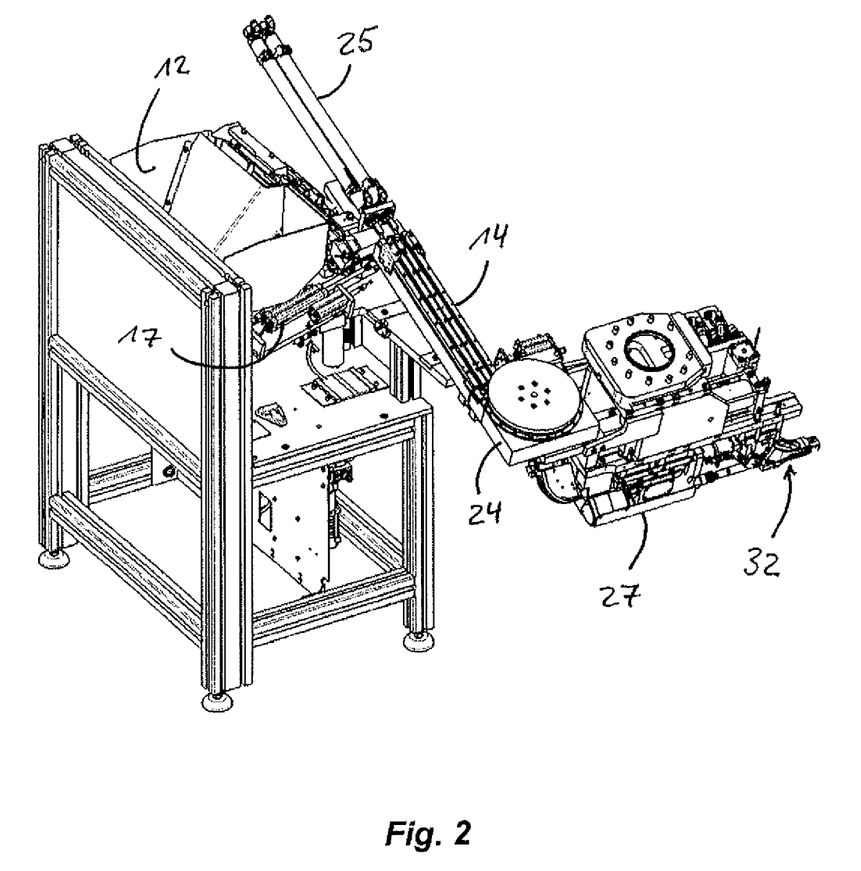
FIG. 2 a joining system in accordance with the invention with only one reservoir for joining elements to be processed.

A first embodiment of a joining system is shown in FIG. 1 that has two trough-like reservoirs 12, 12' for the joining elements 10 to be processed for the provision of two different types of joining elements 10. FIG. 2 shows a second embodiment of a joining system that only has one trough-like reservoir 12 and that is therefore provided for the processing of a single type of joining elements 10.

In the present embodiment, the joining elements 10 are screws, in particular metal screws, so that the joining system shown can be called a screwing system. It is in particular an automatic screwing system here. In general, the joining elements 10 can, however, also be elements that are processed in flow drilling processes or thread-free setting elements that can, for example, comprise a metal material or a plastic material and/or that can be processed in friction welding processes.

The joining system comprises a storage line 14 for buffering joining elements 10 that are provided from the reservoir 12 or from the reservoirs 12, 12' by means of a mechanical conveying mechanism known per se. The storage line 14 is designed as linear and has two receiving grooves 16, 16' extending in parallel with one another for the receiving of the provided joining elements 10. The length of the storage line 14 is selected such that a desired number of joining elements 10 can be buffered in the storage line 14; in the present embodiment, 25 joining elements 10 in each receiving groove 16.

Figure 3:
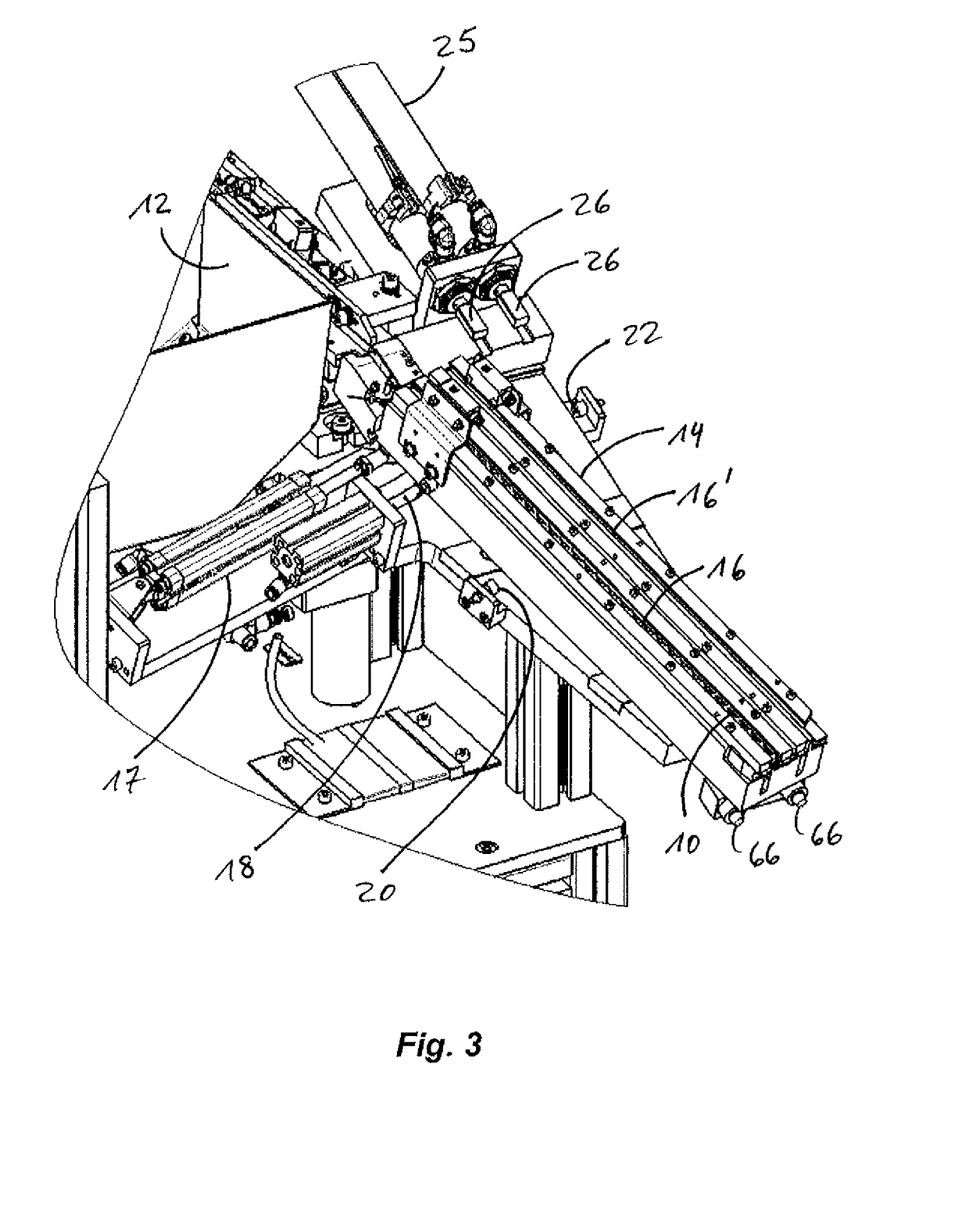
FIG. 3 a storage line of the joining system of FIG. 1 or 2 in a first loading position.

To lead the storage line 14 with joining elements 10, the storage line 14 can be pivoted by means of a pneumatic cylinder 17 out of a starting position also called a coupling position here into a first loading position defined by a first abutment 18 (FIG. 3) in which first loading position the one receiving groove 16 is aligned with the conveying mechanism such that the joining elements 10 supplied by the conveying mechanism can be introduced into said receiving groove 16; for example, joining elements 10 of the one type that are removed from the one reservoir 12.

Figure 4:
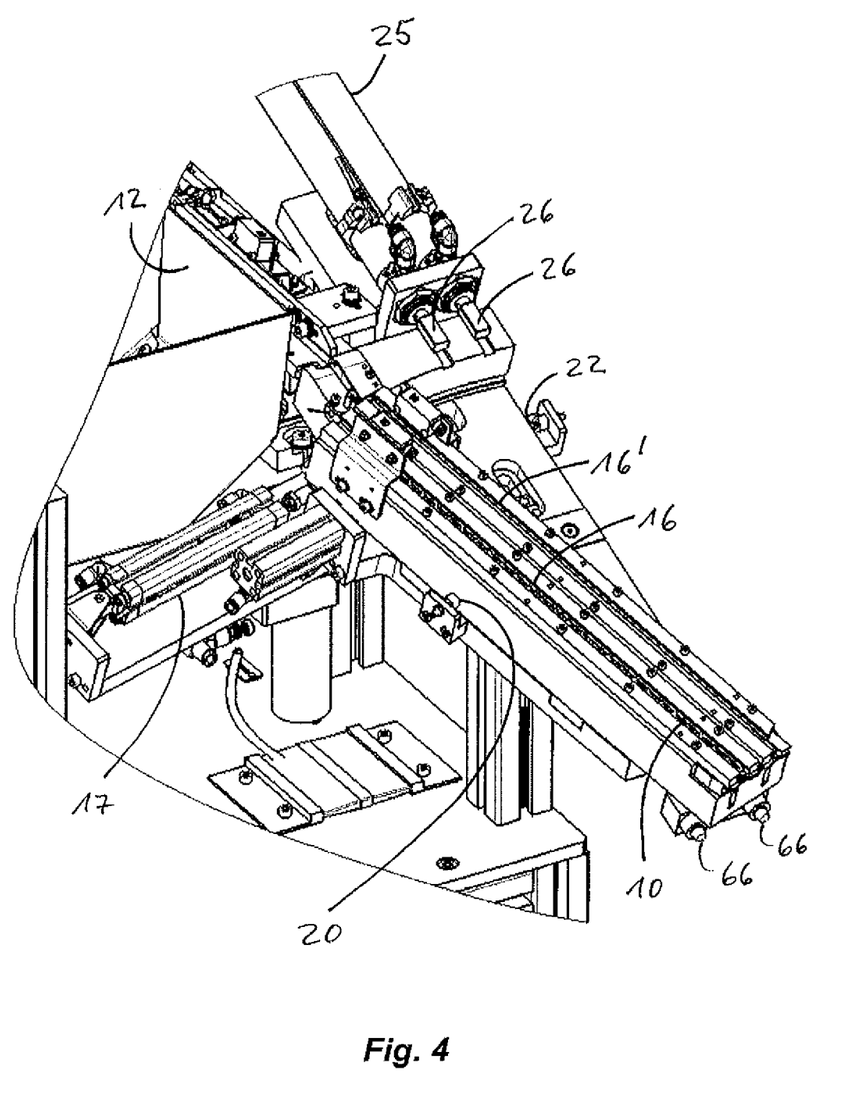
FIG. 4 the storage line of the joining system of FIG. 1 or 2 in a second loading position.

After filling the one receiving groove 16, the storage line 14 can be further pivoted into a second loading position defined by a second abutment 20 (FIG. 4) in which second loading position the other receiving groove 16' is aligned with the conveying mechanism such that the joining elements 10 now supplied by the conveying mechanism can be introduced into the other receiving groove 16'; for example, joining elements 10 of the other type that are removed from the other reservoir 12'.

Figure 5:
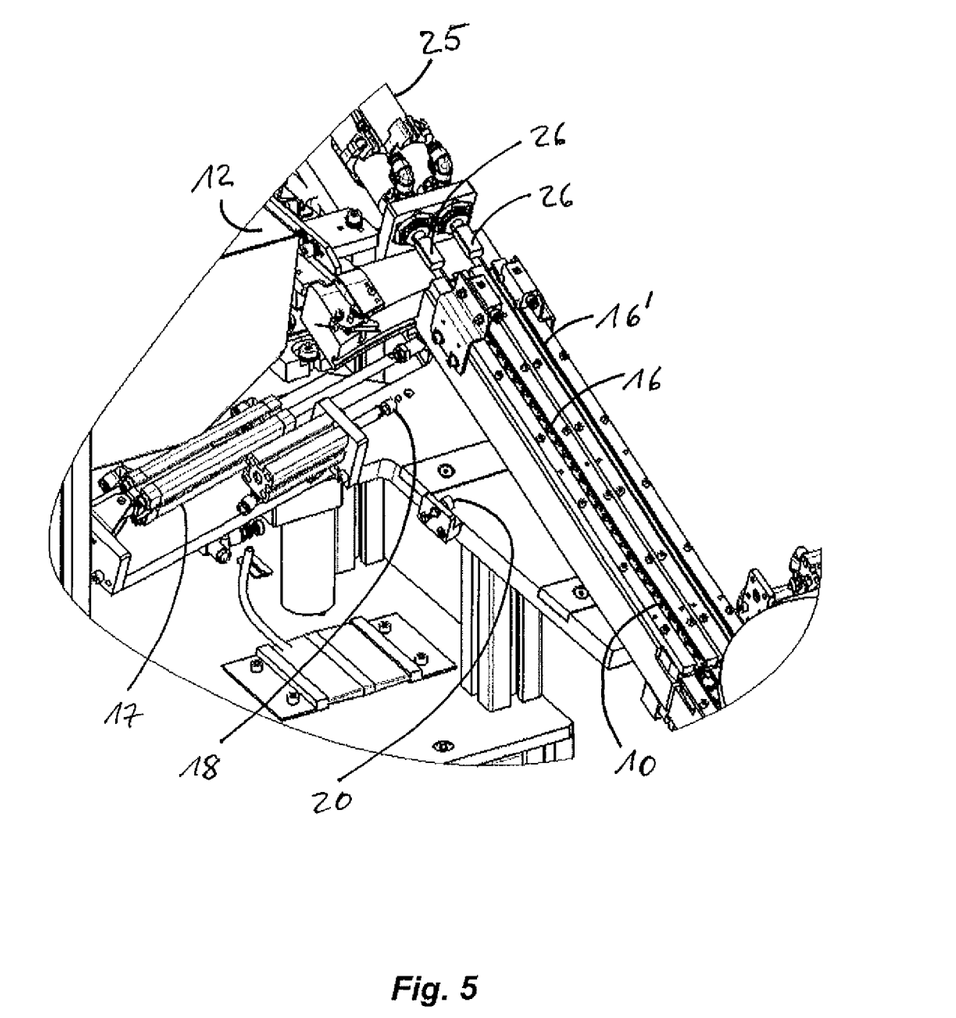
FIG. 5 the storage line of the joining system of FIG. 1 or 2 in a coupling position.

Once the storage line 14 is fully loaded, it can again be pivoted back into the coupling position that is defined by a third abutment 22 (FIG. 5).

As can be recognized in FIGS. 1 to 5, the pivoting of the storage line 14 takes place in a plane in which the receiving grooves 16 are disposed and which is inclined obliquely downwardly in the present embodiment starting from the conveying mechanism.

In the coupling position shown in FIGS. 1, 2 and 5, a magazine 24 is couplable to the storage line 14 to transfer the buffered joining elements 10 from the storage line 14 into the magazine 24. The transfer of the joining elements 10 takes place by means of a transfer device 25 that comprises two pneumatically actuable pistons with sliders 26 that can dip into the receiving grooves 16 of the storage line 14 to slide the joining elements 10 located in the receiving grooves 16 out of said receiving grooves and to press them into the magazine.

Figure 6:
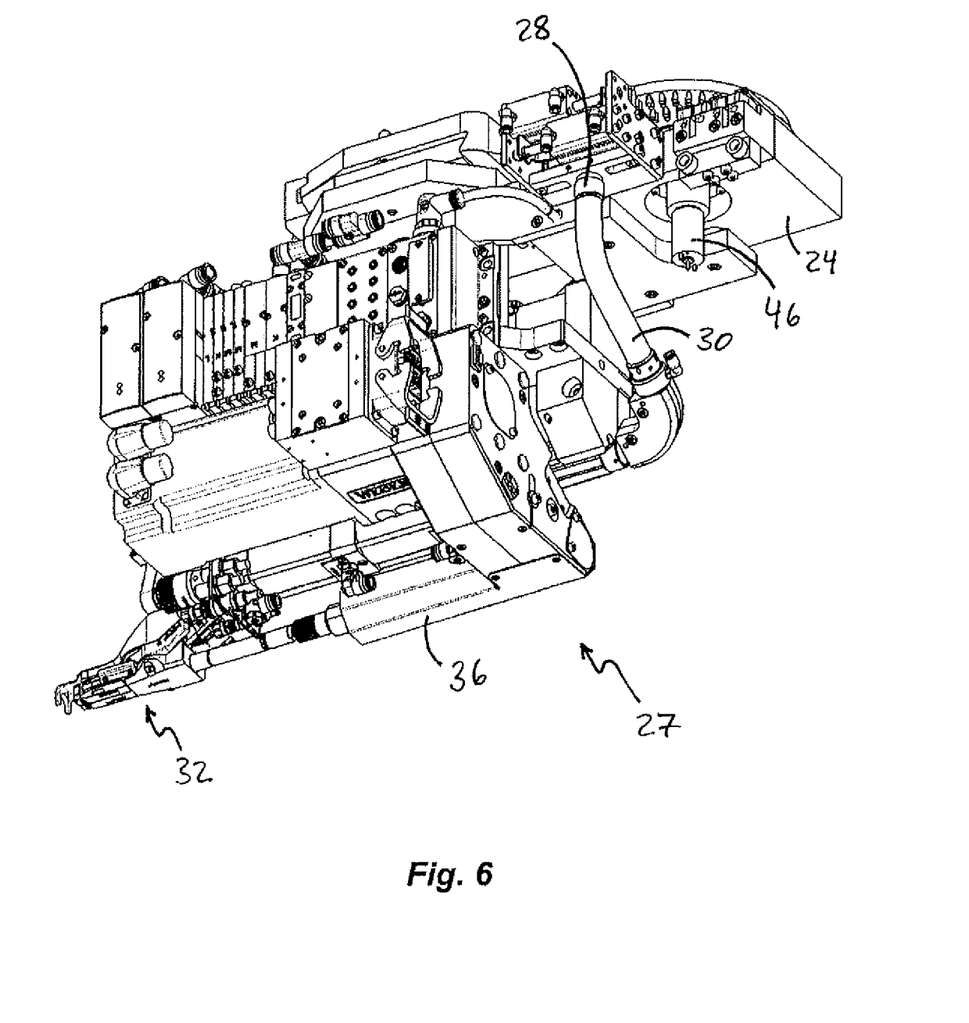
FIG. 6 a first perspective view of a joining apparatus in accordance with the invention with a magazine attached thereto.

The magazine 24 is installed at the outer side of a joining apparatus 27 (FIG. 6), here an automatic screwing device, that is in turn movably supported in space and can, for example, be installed at a robot arm. The magazine 24 has a magazine outlet 28 for dispensing stored joining elements 10 to which a hose line 30 is connected via which the dispensed joining elements 10 can be supplied by means of compressed air to a tool head 32 of the joining apparatus 27. The tool head 32 supports a tool, a screw tool here, that can be set into rotation about its longitudinal axis by a rotary feed unit 36 of the joining apparatus 27 and that can be pushed forward along the longitudinal axis to bring the tool into engagement with a supplied joining element 10 and to process the joining element 10, in this case to screw it into a component to be joined.

Figure 7:
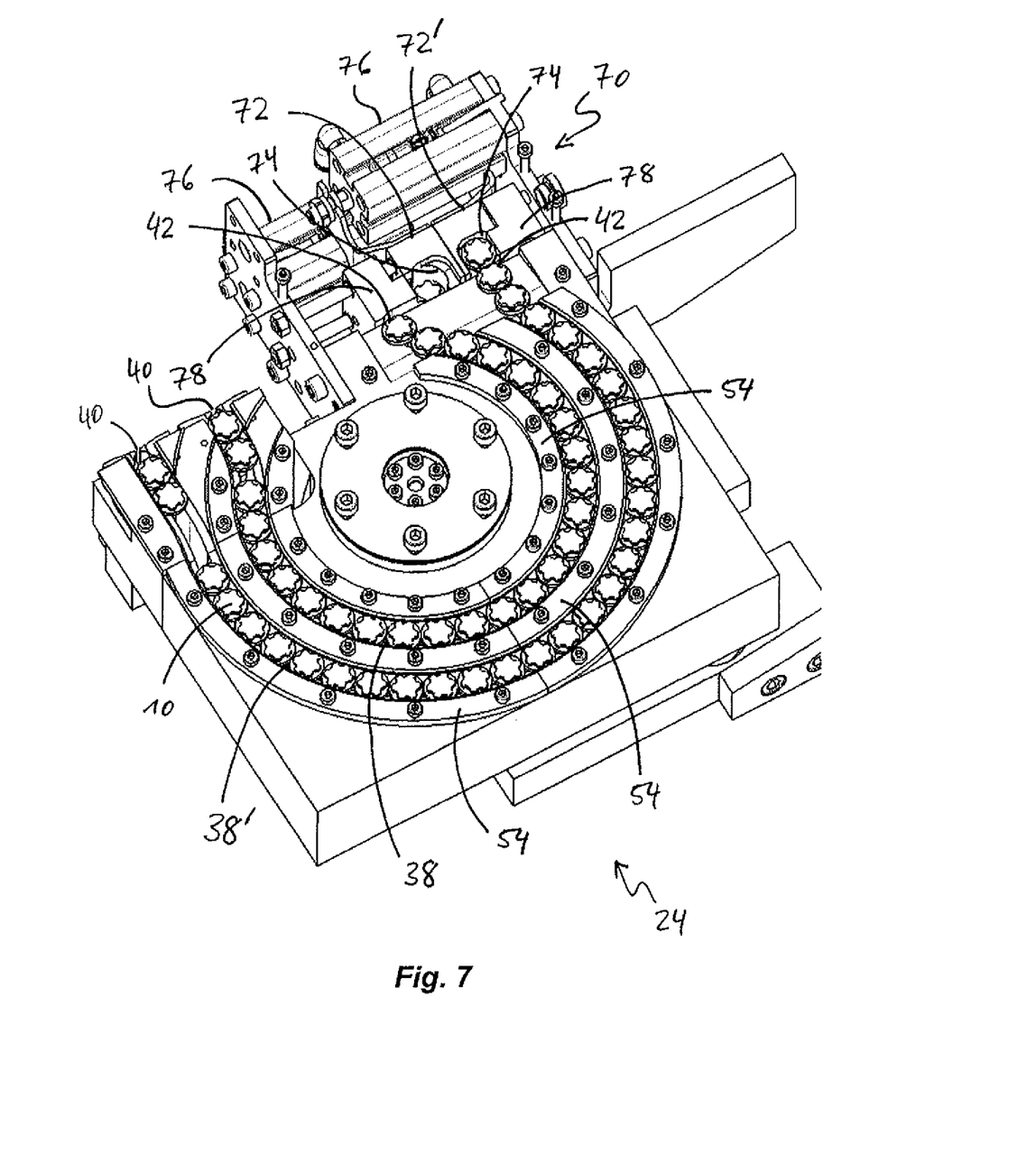
FIG. 7 the magazine of FIG. 6 without a plate brush and cover with a separation unit in a first position.
Figure 8:
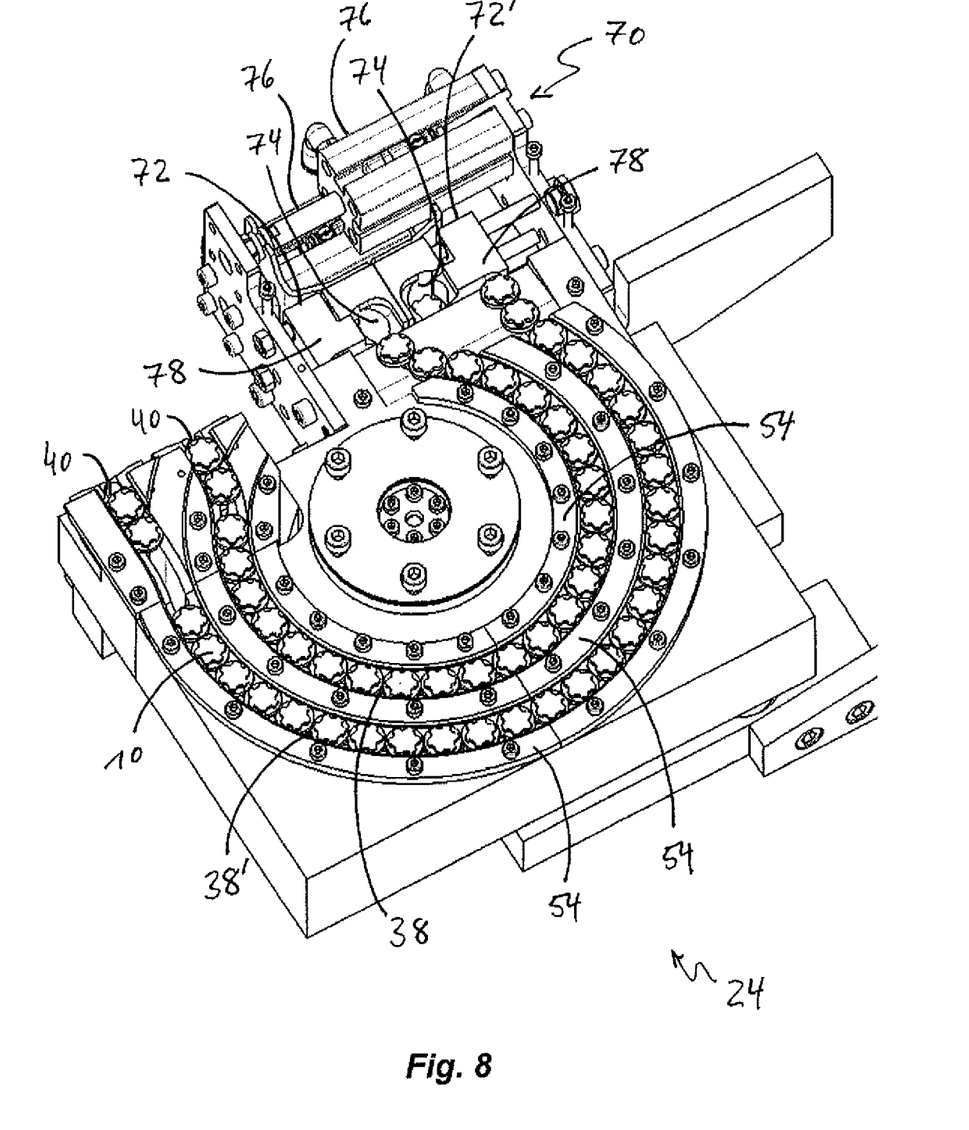
FIG. 8 the magazine of FIG. 6 without a plate brush and cover with a separation unit in a second position.
Figure 9:
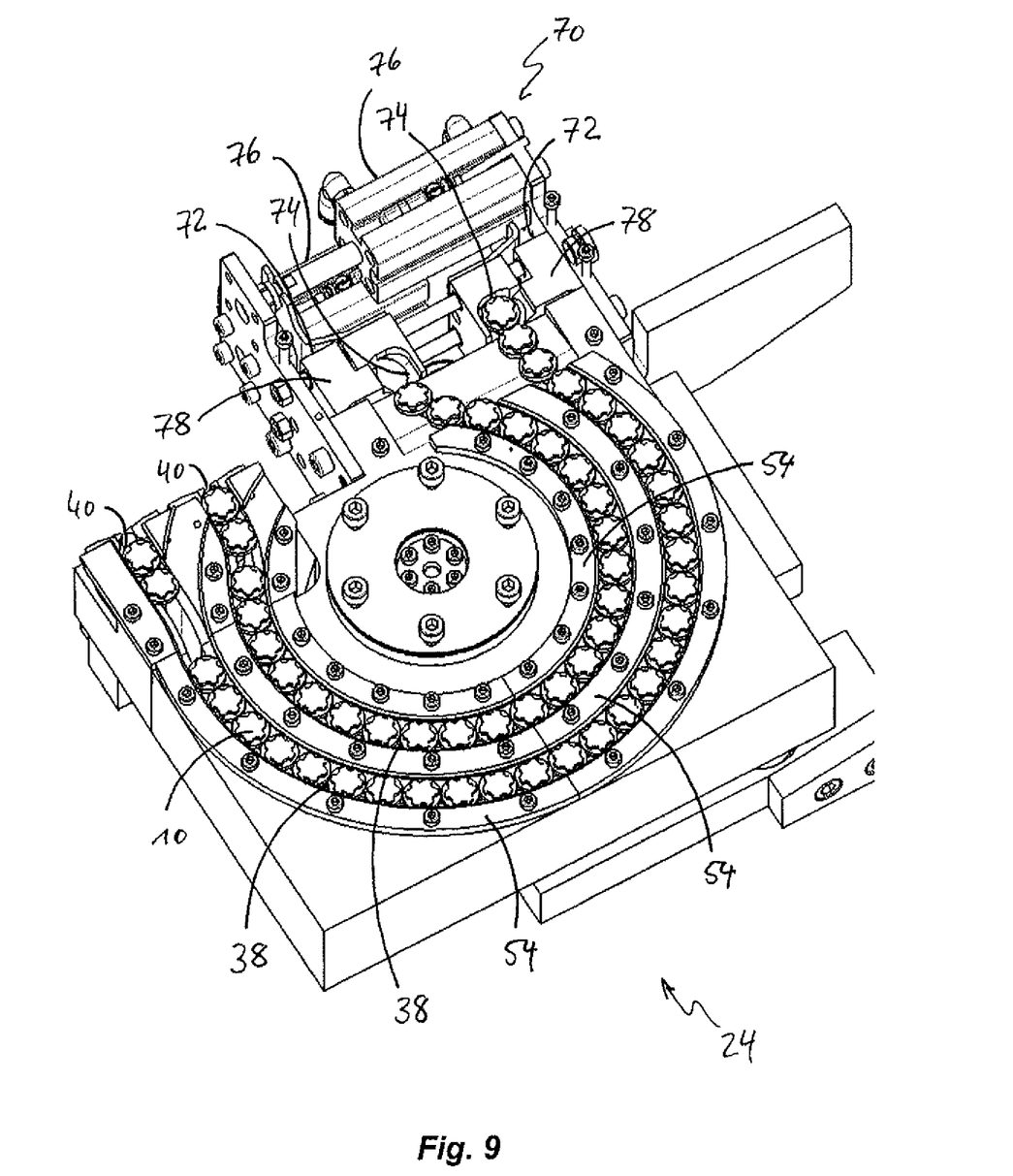
FIG. 9 the magazine of FIG. 6 without a plate brush and cover with a separation unit in a third position.

As FIGS. 7 to 9 show, the magazine 24 furthermore has two storage grooves 38 for receiving the joining elements 10 that were transferred from the storage line 14. The storage grooves 38 extend at least sectionally, more precisely over a little more than 180°, along two mutually concentric circular paths, i.e. the storage grooves 38 extend largely in parallel with one another. The storage grooves 38 only deviate from their parallel extent, in that they diverge, in the region of their input ends 40 and of their output ends 42.

The radius of curvature of the storage grooves 38 is selected such that they can completely receive at least the set of joining elements 10, here of 2×25 joining elements 10, transferred from the storage line 14. At the same time, the magazine 24 should ideally, however, not become empty before a new filling with joining elements 10 so that the length of the storage grooves 38 of the magazine 34 is ultimately dimensioned a little more generously than the length of the receiving grooves 16 of the storage line 14.

If two different types of joining elements 10 are processed, it is advantageous if the storage grooves 38 have different designs and are each adapted to the joining elements 10 to be received. The storage grooves 38 can differ in their depths and widths, for example. The same also applies in another respect to the receiving grooves 16 of the storage line 14. If, however, the joining elements 10 to be processed only differ slightly or if only one type of joining elements 10 is processed, the storage grooves 38 of the magazine 24 can, just like the receiving grooves 16 of the storage line 14, also have an identical cross-section.

Figure 10:
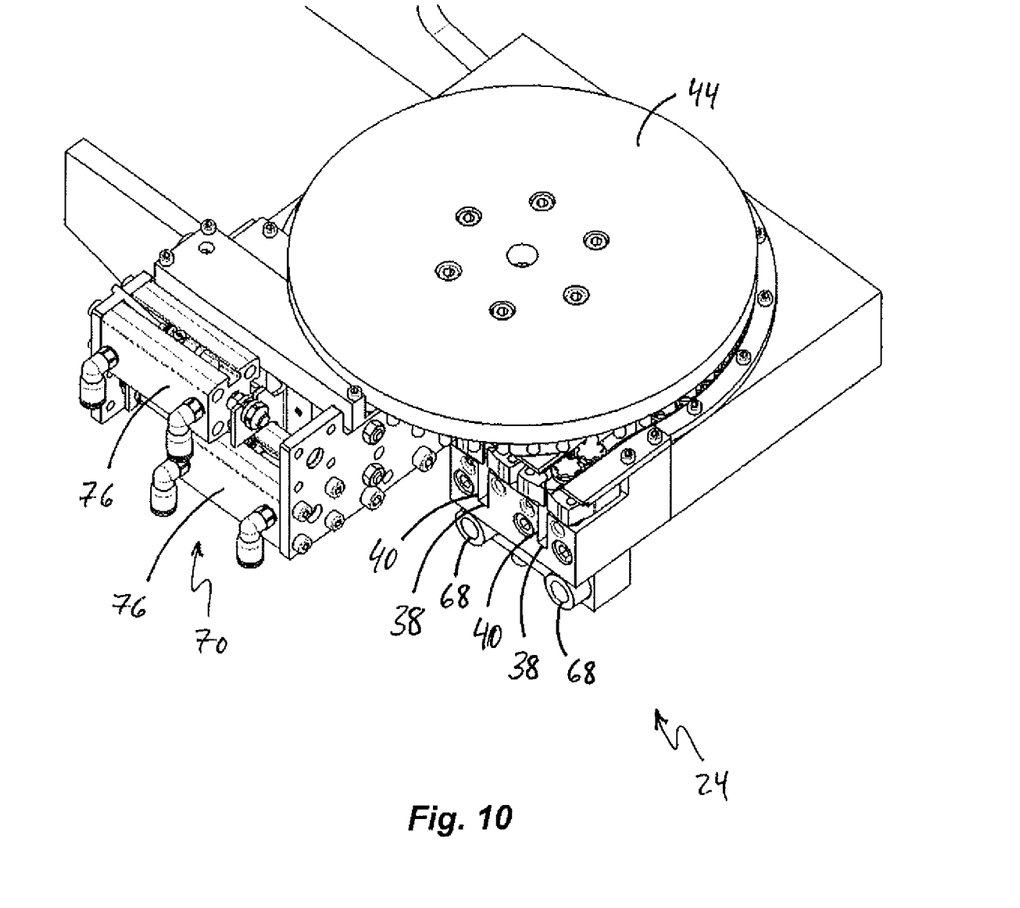
FIG. 10 a first perspective view of the magazine of FIG. 6 with a plate brush.
Figure 11:
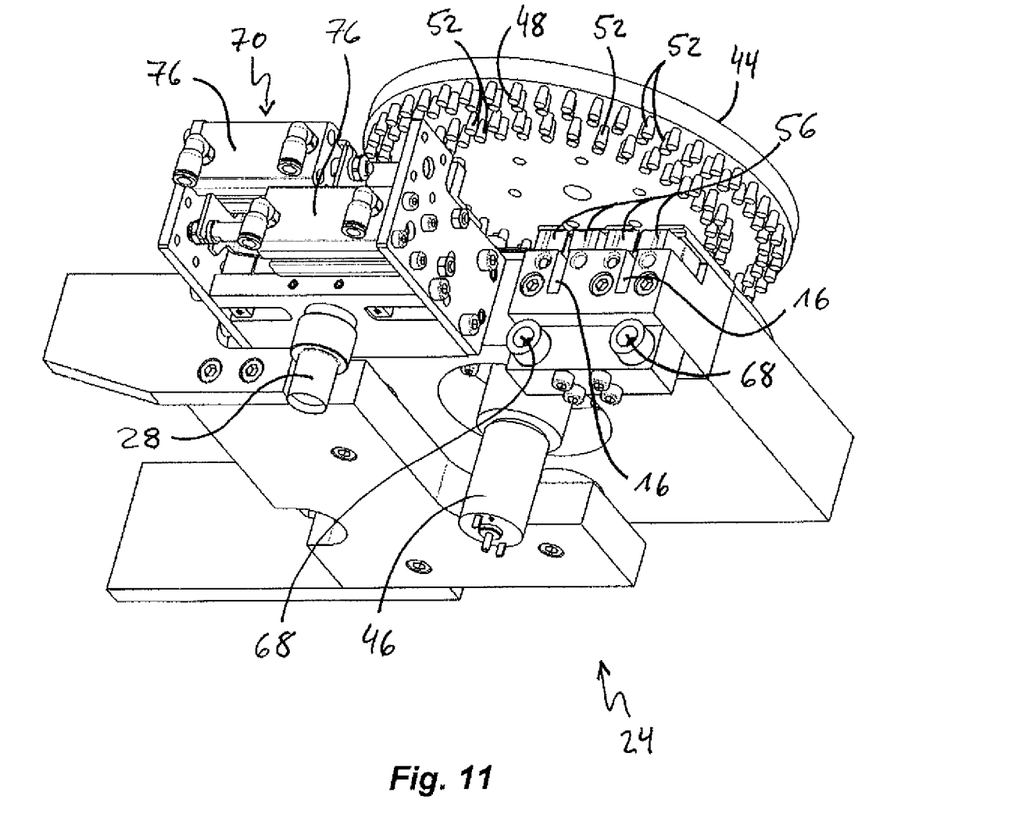
FIG. 11 a second perspective magazine of FIG. 6.

The feed of the stored joining elements 10 along the storage grooves 38 takes place by means of a plate brush 44 (FIGS. 10 and 11) that is arranged above the storage grooves 38 and that is rotatable about an axis of rotation that extends perpendicular to the plane in which the storage grooves 38 extend and through the center of curvature of the storage grooves 38. A motor 46 is provided for the drive of the plate brush 44. Bristles 48 that are in engagement with the heads 50 of the joining elements 10 stored in the storage grooves 38 are formed at a lower side of the plate brush 44 facing the storage grooves 38. In this respect, the bristles 48 are not arranged over the whole surface, but are rather limited to two concentric bristle rings that are aligned with the storage grooves 38, i.e. that therefore have corresponding radii of curvature. In the embodiment shown, each bristle ring is formed from two rows of bristle tufts 52; generally, however, a different number of rows or even a homogeneous, wide bristle ring would be conceivable.

Figure 12:
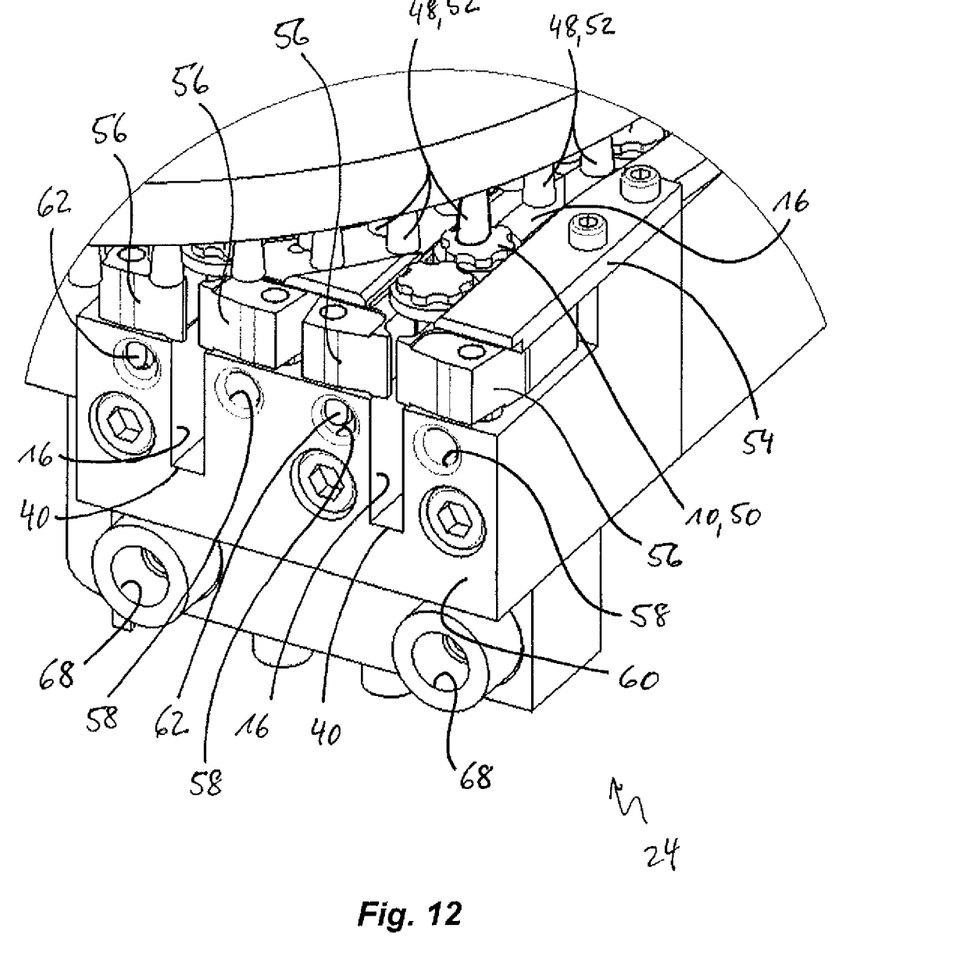
FIG. 12 shows a detailed view of a blocking mechanism of the magazine of FIG. 6.

As shown in more detail in FIG. 12, rails 54 are provided in the region of the upwardly open sides of the storage grooves 38; they extend along the storage grooves 38 and are spaced apart from the upwardly open sides of the storage grooves 38 to partly project over the heads 50 of the stored joining elements 10. The rails 54 prevent a falling out of the joining elements 10 over the open sides of the storage grooves 38 for the event that the plate brush 44 should be dismantled in an overhead position of the magazine 24 and thus form a guide for the heads 50 of the stored joining elements 10.

To prevent a falling out of the transferred joining elements 10 at the inlet ends 40 of the storage grooves 38, a blocking mechanism is provided in the region of the inlet end 40 of each storage groove 38 at which the joining elements 10 can be introduced into the storage groove 38. Each blocking mechanism comprises two catches 56 that are movably supported above the respective storage groove 38 and at oppositely disposed sides thereof and are preloaded with respect to one another by spring force to block the return path for the heads 50 of the joining elements 10 introduced into the storage groove 38.

A bore 58 is provided beneath the catch 56 in a front wall 60 of the magazine 24 bounding the inlet end 40 of the respective storage groove 38 and permits access to an actuation section 62 of the catch 56 with whose aid the catch 56 can be pushed open.

Figure 13:
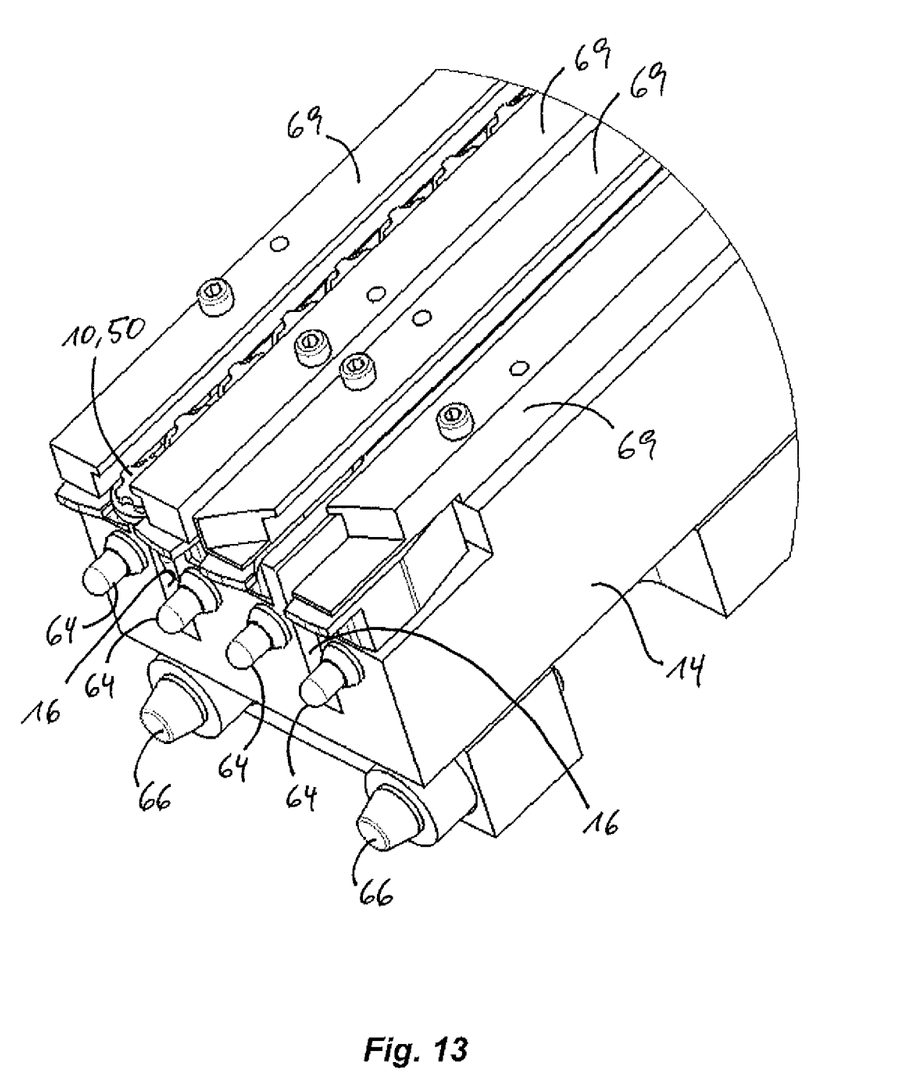
FIG. 13 a detailed view of a coupling end of a storage line of an allocation apparatus of the joining system of FIGS. 1 to 2 for providing joining elements.

As FIG. 13 shows, actuation pins 64 are provided at oppositely disposed sides of the outlet of each receiving groove 16 at the lower end of the storage line 14 of the allocation apparatus. These actuation pins 64 are configured and arranged such that they move into the bores 58 in the front wall 60 of the magazine 24 on the coupling of the magazine 24 to the storage line 14 and press open the catches 56 by means of the actuation sections 62 so that the joining elements 10 can be transferred into the magazine 24 unimpeded by the storage line 14.

To simplify the coupling of the magazine 24 to the storage line 14, the storage line 14 is additionally provided at its lower end with two centering pins 66 that cooperate with two corresponding centering opens 68 of the magazine 24 to ensure a correct alignment of the magazine 24 with the storage line 14 and in particular to ensure a flush alignment of the receiving grooves 16 of the storage line with the storage grooves 38 of the magazine 24.

The storage line 14 furthermore also has rails 69 that extend in parallel with the receiving grooves 16 and that, in a similar manner to the rails 54 of the magazine 24, provide an additional guidance of the joining elements 10 buffered in the receiving grooves 16, in particular a guidance of the heads 50 of the joining elements 10, and prevent the joining elements 10 from falling out of the receiving grooves 16.

Referring again to FIGS. 7 to 9, a separation unit 70 is arranged in the region of the outlet ends 42 of the storage grooves 38 which serves to selectively remove the stored joining elements 10 from the one or the other storage groove 38 and to transfer them to the magazine outlet 28. The separation unit 70 comprises two separation sliders 72 that are each associated with one storage groove 38. Each separation slider 72 has a chamber 74 for receiving a joining element 10 that is open laterally toward the storage groove 38 so that a joining element 10 pushed forward by the plate brush 44 can advance into the chamber 74 of the separation slider 72 when the chamber 74 is aligned with the associated storage groove 38. The chamber 74 is furthermore open at its lower side so that a joining element 10 received in the chamber 74 can be transferred to the magazine outlet 28.

The separation sliders 72 are displaceable in the plane defined by the extent of the storage grooves 38 by means of respective pneumatic cylinders 76 in a direction transverse to the storage grooves 38 in the region of their outlet ends 42, and indeed between a first position in which the chamber 74 is aligned with its associated storage groove 38 for receiving a joining element 10 and a second position in which the chamber 74 is aligned with the magazine outlet 28 to transfer the received joining element 10 to the magazine outlet 28. In addition, each separation slider 72 has a blocking section 78 that is adjacent to the chamber 74 and that blocks the outlet end 42 of the associated storage groove 38 when the separation slider 72 is in its second position.

In FIG. 7, the separation slider 72 associated with the inner storage groove 38 is in the second position in which a joining element 10 is just moving out of its chamber 74 into the magazine outlet 28 while the separation slider 72' associated with the outer storage groove 38' is just receiving a joining element 10 in the first position.

FIG. 8 shows a reverse situation in which the separation slider 72 associated with the outer storage groove 38 is in the second position in which a joining element 10 is just moving out of its chamber 74 into the magazine outlet 28 while the separation slider 72 associated with the inner storage groove 38 is just before receiving a joining element 10 in the first position.

FIG. 9 shows a situation in which both separation sliders 72 simultaneously adopt their first positions to respectively receive a joining element 10.

As long as the magazine outlet 28 is located beneath the separation unit 70, it is generally conceivable to drop a joining element 10 from a separation slider 72 into the magazine outlet 28 solely due to gravity. Such a relative arrangement can, however, not always be ensured with a joining apparatus 24 freely movable in space. The magazine 24 therefore has a compressed air device, not shown in the Figures, which is aligned with the magazine outlet 28 and by means of which a joining element 10 can even be blown out of a separation slider 72 located in the second position into the magazine outlet 28 and through the hose line 30 up to the tool head 32 when the magazine outlet 28 is located at the level of the separation unit 70, or even above it, due to the working position of the joining apparatus 27.

REFERENCE NUMERAL LIST 10 joining element
12 reservoir
14 storage line
16 groove
17 pneumatic cylinder
18 abutment
20 abutment
22 abutment
24 magazine
25 transfer device
26 slider
27 joining apparatus
28 magazine outlet
30 hose line
32 tool head
36 rotary feed unit
38 storage groove
40 inlet end
42 outlet end
44 plate brush
46 motor
48 bristles
50 head of the joining element
52 bristle tuft
54 rail
56 catch
58 bore
60 front wall
62 actuation section
64 actuation pin
66 centering pin
68 centering opening
69 rail
70 separation unit
72 separation slider
74 chamber
76 cylinder
78 blocking section

The invention claimed is:

1. A magazine (24) for receiving a plurality of joining elements (10) and for supplying the joining elements (10) to a joining apparatus (27) comprising two storage grooves (38) for storing and guiding the joining elements (10) which storage grooves (38) extend at least sectionally around an axis along two mutually concentric circular tracks, wherein a main extension direction of the joining elements is substantially parallel to the axis, characterized in that a head guide for guiding heads (50) of the stored joining elements (10) is provided in the region of an open side of each storage groove (38) along the two mutually concentric circular tracks of the grooves with the head guide comprising at least one rail (54) that is spaced apart from the open side of the storage groove (38) to partly project over the heads (50) of the stored joining elements (10).

2. The magazine (24) in accordance with claim 1, characterized by a feed mechanism for moving the stored joining elements (10) along the storage grooves (38).

3. The magazine (24) in accordance with claim 2, characterized in that the feed mechanism comprises a plate brush (44) whose bristles (48) are in engagement with the stored joining elements (10), in particular with the plate brush (44) being rotatable about an axis of rotation that extends through the center of curvature of the storage grooves (38).

4. The magazine (24) in accordance with claim 3, characterized in that the bristles (48) are arranged only along two concentrically extending circular paths that coincide with the storage grooves (38).

5. The magazine (24) in accordance with claim 1, characterized in that a blocking mechanism that prevents the joining elements (10) from falling out of the storage groove (38) is provided in the region of an inlet end (40) of one or each of the storage grooves (38) at which the joining elements (10) can be introduced into the storage groove (38).

6. The magazine (24) in accordance with claim 5, characterized in that the blocking mechanism comprises two movably supported catches (56) that are preloaded toward one another by spring force to block the storage groove (38).

7. The magazine (24) in accordance with claim 5, characterized in that the blocking mechanism is configured such that it can be forcibly opened by a means for providing joining elements (10) to be introduced into the storage grooves (38).

8. The magazine (24) in accordance with claim 1, characterized in that a separation unit (70) is arranged in the region of outlet ends (42) of the storage grooves (38) at which the joining elements (10) are removable from the storage grooves (38) to transfer a joining element (10) selectively removed from the one or the other storing groove (38) to a magazine outlet (28).

9. The magazine (24) in accordance with claim 8, characterized in that the separation unit (70) comprises at least one separation slider (72).

10. The magazine (24) in accordance with claim 8, characterized in that a separation slider (72) is associated with each storage groove (38), with the separation sliders (72) being separately controllable and being actuable independently of one another, in particular pneumatically.

11. The magazine (24) in accordance with claim 8, characterized in that a compressed air device by means of which a joining element (10) is movable out of the separation unit (70) into the magazine outlet (28).

12. The magazine (24) in accordance with claim 8, characterized in that the magazine outlet (28) forms a connector for a hose line (30).

13. The joining apparatus (27) having a magazine (24) in accordance with claim 8 attached thereto.

14. The joining apparatus (27) in accordance with claim 13, characterized in that the joining element (10) removed from the magazine (24) can be supplied to a tool of the joining apparatus (27) by means of compressed air; and/or in that an outlet (28) of the magazine is connected via a compressed air line, in particular a hose line (30), to a tool head (32) of the joining apparatus (27) supporting a tool.

15. A system comprising the joining apparatus (27), in particular in accordance with claim 14; and an allocation apparatus for providing the plurality of joining elements (10) that has a storage line (14) for buffering the plurality of joining elements (10) that has the at least two tracks and can be coupled to a magazine (24) of the joining apparatus (27) and that has a transfer device (25) to transfer the plurality of joining elements (10) from the coupled storage line (14) into the magazine (24).

16. A system comprising the joining apparatus (27), in particular in accordance with claim 13; and an allocation apparatus for providing the plurality of joining elements (10) that has a storage line (14) for buffering the plurality of joining elements (10) that has the at least two tracks and can be coupled to a magazine (24) of the joining apparatus (27) and that has a transfer device (25) to transfer the plurality of joining elements (10) from the coupled storage line (14) into the magazine (24).

* * * * *